United States Patent Office 2,750,345
Patented June 12, 1956

2,750,345
PROCESS FOR PRODUCING SOLS OF 5–8 MILLIMICRON SILICA PARTICLES, AND PRODUCT

Guy B. Alexander, Wilmington, Del., assignor to E. I. du Pont de Nemours and Company, Wilmington, Del., a corporation of Delaware No Drawing. Application February 25, 1954, Serial No. 412,627

7 Claims. (Cl. 252—313)

This invention relates to silica sols which are water-clear and stable at relatively high concentrations and contain discrete silica particles having high specific surface area, and is more particularly directed to such sols containing dense silica particles 5 to 8 millimicrons in diameter, corresponding to a specific surface area, A, of 350 to 600 square meters per gram, the sols having a silica concentration, as percent $SiO_2$, of from $$15 \text{ to } \frac{12{,}000}{A}$$

being alkali-stabilized with an amount of alkali sufficient to give an $SiO_2$:alkali oxide mol ratio of from $$\frac{1.2 \times 10^4}{A} \text{ to } \frac{12 \times 10^4}{A}$$

and containing substantially no soluble salts. The invention is further directed to novel processes for producing such sols comprising removing metal cations from an alkali metal silicate solution by ion exchange to form a dilute silicic acid sol, alkalizing the sol to an $SiO_2$:alkali oxide mol ratio of from 30:1 to 150:1, heating the alkalized sol to a temperature of from 50 to 125° C. whereby the ultimate silica particles are grown to a size corresponding to a surface area of from 350 to 600 square meters per gram, bringing the sol into contact with a cation- and an anion-exchanger to remove substantially all salts therefrom, alkalizing to an $SiO_2$:alkali oxide mol ratio of from 20:1 to 300:1, and concentrating the sol to at least 15% $SiO_2$ by removing water.

Silica sols which contain discrete silica particles and are stable at concentrations upward of 15% $SiO_2$ have recently become available and are described in United States Patent 2,574,902 issued November 13, 1951, to Bechtold and Snyder. The size of the individual particles in such sols has been built up into the range of 15 to 130 millimicrons average diameter by the processes described in the patent. Now while silica sols containing particles of this size have a high degree of utility for many purposes, there are other uses in which sols containing smaller particles at concentrations upwards of 15% would be highly desirable. Sols of smaller discrete particles inherently have different properties because the silica particles have substantially greater specific surface area. Thus, while 15 millimicron silica particles in a sol of the Bechtold and Snyder type might have a specific surface area about 200 square meters per gram, a sol of discrete particles 7 millimicrons in diameter might have a surface area of about 400 square meters per gram. This difference in surface area accounts for the substantial difference in usefulness of the two sols.

In conventional silica sols, the freshly prepared silica has relatively low molecular weight and is in the form of particles of very small dimensions—the particles being of a size below the practical limits of resolution of an electron microscope. Upon aging, such particles increase in size to two or three millimicrons but also they join together in masses or chains of such 2 to 3 millimicron particles, and this process of aggregation continues until the sol eventually gels, unless it is in some manner stabilized. This aggregation process is particularly noticeable if one attempts to concentrate a conventional silica sol. It is found that the sol will gel well before a concentration of 15% $SiO_2$ is reached. Therefore, while the silica has a very high surface area the sols have only a limited practical usefulness because of their instability and very low concentration.

In United States Patent 2,631,134, issued March 10, 1953, to R. K. Iler and F. J. Wolter, processes are shown which can produce sols containing particles in the range of 5 to 8 millimicrons in diameter, but no method is described whereby a concentration higher than about 12% $SiO_2$ is obtained. In United States patent application Serial No. 274,198 filed February 29, 1952, jointly by E. C. Broge, R. K. Iler and me, the preparation of similar small particle-sized sols is described, the sols being for the purpose of making gels therefrom and hence being unstable. In United States patent application Serial No. 376,521 filed August 25, 1953, by R. K. Iler, Patent No. 2,727,008, the preparation of silica sols having particles 5 to 20 millimicrons in diameter which are relatively stable at concentrations of 10 to 20 per cent $SiO_2$ has been described. In the present application are described sols containing 5 to 8 millimicron particles of silica, said sols having a higher order of stability in the range above 15 per cent $SiO_2$ and, indeed, being permanently stable in this range.

There has been a need for silica sols which are substantially water-clear, and this need has not been met by any silica sol of small particle size (5 to 8 millimicron particles) and practical concentration (upwards of 15% $SiO_2$) heretofore suggested. There are various uses for colloidal silica—for example, the treatment of rugs to prevent soiling—which depend upon the fact that particles of colloidal silica can be deposited upon the fibers without undue whitening, whereby it is possible to remove soil very readily by vacuuming. The larger the particles of colloidal silica, the greater is the tendency for the deposit to reflect light in the form of a whitening of the fibers. This is undesirable, since it detracts from the brilliant color of the rugs. There are many other uses where silica is deposited in extremely thin layers on substrates, where whitening must be avoided. This behavior has limited the amount of silica which can be deposited from sols of conventional types.

The amount of whitening of a deposit of silica is related to the turbidity of the colloidal solution of silica which is applied—that is, if the colloidal solution of silica is turbid, then the deposit of silica is also likely to be somewhat turbid, or cloudy in appearance. If the colloidal solution of silica is perfectly water-clear, however, the film which is laid down is also more likely to be clear. It is to be understood that if too much silica is used, so that it readily dusts off the surface of the solid to which it is applied, then a whitish appearance will also become evident even when the treating sols are water-clear, but for equivalent amounts the clear sols have a definite advantage.

Now according to the present invention silica sols are provided which are water-clear and stable at relatively high concentrations of silica even though the silica is present in the form of discrete particles which are small enough to give high specific surface area. More particularly, the novel sols contain dense silica particles 5 to 8 millimicrons in diameter, corresponding to a specific surface area, A, of 350 to 600 square meters per gram, have a silica concentration, as percent $SiO_2$, of from $$15 \text{ to } \frac{12{,}000}{A}$$

are alkali-stabilized with an amount of alkali sufficient to give an $SiO_2$:alkali oxide mol ratio of from $$\frac{1.2 \times 10^4}{A} \text{ to } \frac{12 \times 10^4}{A}$$

and contain substantially no soluble salts. These novel sols are prepared according to the invention by processes in which metal cations are removed from an alkali metal silicate solution by ion exchange to form a dilute silicic acid sol, the sol is alkalized to an $SiO_2$:alkali oxide mol ratio of from 30:1 to 150:1, the alkalized sol is heated to a temperature of from 50 to 125° C. whereby the ultimate silica particles are grown to a size corresponding to a surface area of from 350 to 600 square meters per gram, the sol is brought into contact with a cation- and an anion-exchanger to remove substantially all salts therefrom, the deionized sol is alkalized to an $SiO_2$:alkali oxide mol ratio of from 20:1 to 300:1, and the sol is concentrated to at least 15% $SiO_2$ by removing water.

The initial silica sol used as a starting material in the processes of this invention can be prepared by any of numerous methods with which the art is already familiar. For instance, it can be made by neutralizing a dilute sodium silicate solution with an acid such as hydrochloric acid. However, such a sol contains large quantities of both cations and anions which must be removed in the processes of the invention and, hence, nothing is gained by using such an acid neutralization. It is very much preferred to make the initial sol by passing a dilute sodium silicate solution through a cation-exchange resin in the hydrogen form as taught in the Bird United States Patent 2,244,325. A sol prepared in this manner will ordinarily have an $SiO_2$ content in the range up to about 4 per cent, and will contain silica particles having an average ultimate size of less than 4 millimicrons.

Whatever the manner used for preparing the initial silica sol it should be capable of giving a sol containing ultimate silica particles less than about 5 millimicrons in diameter. By "ultimate" particles are meant the smallest unit particles which can be identified in the sol. It will be understood that the ultimate particles in the sol have a considerable tendency to join together into aggregates, or chains, or networks of chains. If this aggregation proceeds far enough the sol will gel. It is particularly preferred to employ silica sols in which the degree of aggregations is at a minimum.

When silica particles in a sol are of a size below about eight millimicrons they are very difficult to measure with the electron microscope because they are too close to the lower limit of resolution of this instrument. It has been established that for discrete particles, such as here involved, the surface area is a function of the particle size. This is an inverse proportion—the larger the particles, the lower is the specific surface area. The determination of specific surface area is a relatively easy matter, certain techniques therefor being given hereinafter. It will be understood that when reference is made in this application to particular particle sizes, the quantitative measurement of such sizes may have been calculated from surface area data, and in fact, specific surface areas and particle sizes may be used interchangeably hereinafter in describing this invention.

Now having selected a starting sol of suitable small-sized particles containing a very low concentration of cations, as above-described, one practicing the invention alkalizes the sol to an $SiO_2$:alkali oxide mol ratio of from 30:1 to 150:1 by adding a suitable alkali. The alkali used for this purpose must not be one which destabilizes the system. Bases of monovalent metals, such as sodium or potassium, or nitrogen bases such as ammonium or tetramethyl ammonium hydroxides, can be employed, but since sodium or ammonium bases are particularly effective and among the cheapest, these are preferred. The silicates of sodium or potassium can also be used advantageously. The amount to use should be such as to give a mol ratio of $SiO_2$ to alkali oxide in the range indicated.

The alkalized sol is now heated to a temperature in the range of 50 to 125° C. to grow the ultimate silica particles up to the size range of 5 to 8 millimicrons in average diameter, corresponding to a surface area of from 350 to 600 square meters per gram. If necessary in order to reach the temperature desired this heating can be carried out under pressure. The rate at which growth occurs increases as the temperature is raised. Below about 60° C. the rate is rather slow for practical operation, but at about 100° C. or the boiling point at atmospheric pressure a very satisfactory rate is achieved. Accordingly, 60 to 100° C. represents a preferred range of heating at this stage of the process.

Care should be exercised not to continue the heating too long—that is, the heating should be discontinued before the surface area falls below about 350 square meters per gram of $SiO_2$. The time required to effect the desired result can be readily determined in any particular instance by heating a given sol at the selected temperature, withdrawing samples periodically, and determining the particle size of the silica in the sol from its surface area as hereinafter described. By plotting the particle size against the time of heating, one can readily find the conditions to make a silica sol having any given particle size.

The silica:alkali oxide mol ratio also affects the rate of growth within the ratio range of 30:1 to 150:1, the lower the ratio, the more rapid the growth of the discrete particles. To illustrate the interrelation of the various factors it is pointed out that a sol alkalized to 80:1 ratio and heated for one-half hour at 100° C. showed a particle growth corresponding to a surface area reduction to 350 m.$^2$/g., whereas a similar sol alkalized to 100:1 ratio and heated at 80° C. for one hour showed a particle growth corresponding to a surface area reduction only to 600 m.$^2$/g.

After growing the particles to the desired extent the sol can be cooled, if desired, to arrest further growth. The sol is then subjected to substantially complete deionization by means of ion-exchangers, both cationic and anionic.

The art is already familiar with techniques for deionizing solutions, and any of the various known methods can be employed. For instance, the sol can be passed through a column of cation exchange resin in the hydrogen form and then through an anion exchange resin in the hydroxide form, and this sequence can be repeated, if necessary, in order to bring the ion content of the sol down to the lowest practical minimum. Alternatively, mixed bed deionization can be applied, according to which cations and anions are simultaneously removed by passing the sol through a mixed bed of cation resin in the hydrogen form and anion resin in the hydroxide form. This method is particularly effective. In either of these methods the sol can be passed down-flow or up-flow through a column of the resin, or the resin can be slurried in the sol with agitation.

The purpose of this step in the process is to remove all destabilizing ions. In ordinary commercial sodium silicate and in industrial waters there are traces of impurities, such as chlorides and sulfates, and even these trace amounts are objectionable. Also, polyvalent cations, such as calcium and aluminum are frequently present and should be removed. Even if one were to start with anion-free raw materials, there would still be objectionable amounts of anions picked up from the cation-exchange resins, since these resins are normally regenerated with an acid such as sulfuric or hydrochloric.

The sol at this point ideally should be purged entirely of anions (except hydroxyl ions, which are not considered to be anions when in the presence of corresponding amounts of hydrogen ions). Since the next step in the process is to alkalize back to a predetermined SiO$_2$:alkali oxide ratio one could, of course, alternatively leave in the required amount of the desired alkali ion, but ordinarily this is not feasible if anions are also to be removed. Also, there is a slight latitude in the amount of foreign ions which can be left in. For instance, if the sol is to have a relatively low ratio within the range of 20 to 300:1, and is not to be concentrated much above 15% SiO$_2$, a slightly greater residue of foreign ions can be tolerated than when the sol is to have a high ratio in this range and a high SiO$_2$ concentration.

After deionizing the sol to the extent described, it is then permanently stabilized by adding alkali until the SiO$_2$: alkali mol oxide ratio is in the range of from 20:1 to 300:1. The considerations applying to this alkalization are the same as those already described for the earlier alkalization.

With the sol thus stabilized, it is concentrated to at least 15% SiO$_2$ by removing water, as by evaporating it off. If desired, such evaporation may be carried on under reduced pressure. The maximum concentration which can be reached is governed by the surface area of the particles in the sol and its ratio, as hereinafter described.

The novel sol products of the invention, obtained according to the above-described processes, are water-clear, stable sols containing dense silica particles 5 to 8 millimicrons in diameter, corresponding to a specific surface area, A, of 350 to 600 square meters per gram, the sols having a silica concentration, as per cent SiO$_2$, of from $$15 \text{ to } \frac{12{,}000}{A}$$

being alkali-stablized with an amount of alkali sufficient to give an SiO$_2$:alkali oxide mol ratio of from $$\frac{1.2 \times 10^4}{A} \text{ to } \frac{12 \times 10^4}{A}$$

and containing substantially no soluble salts.

For measuring these properties of the sols, and for further characterizations, analytical techniques are employed which are adapted from accepted practices but which have not hitherto been described in the literature in reference to this particular problem. Accordingly, certain of these determinations will now be described in detail.

The per cent silica in a sol can be determined by the conventional gravimetric method for determining silica consisting of acidifying an aliquot of the sol, evaporating and igniting, weighing, fuming with HF, and reweighing and determining the silica by the difference in weights.

Per cent silica can also be determined from specific gravity of sols decationized to pH 3±0.5. A direct reading is taken, using a hydrometer, the sol being at 25° C. Silica content is calculated from the equation:

$$\text{Percent SiO}_2 = \frac{\text{Sp. Gv.} - 0.9960}{0.00632}$$

where Sp. Gv. is the specific gravity of the sol 25° C./60° F.

Total alkalinity can be determined by direct titration with standard acid solution, using a Beckman Model G pH meter as the indicator.

The procedure is to weigh a 25 g. sample (having a concentration of SiO$_2$ in the range of 15%) into 150 ml. of distilled water and titrate to pH 4.5 with standard N/10 HCl. Care should be taken to set the pH meter with buffer and adjust the temperature compensator to the temperature of the solution. Calculate per cent alkalinity, as Na$_2$O, from the relationship that 1 ml. N/10 HCl is equivalent to 0.0031 g. Na$_2$O.

The salt content, as per cent sodium sulfate, can be determined from conductivity. The pH of the sol is adjusted to 4.0 by deionizing the sol with well-washed Nalcite HCR resin in the hydrogen form. For the purpose of measuring conductivity, use a Leeds and Northrup conductivity, dip cell (Catalog 4920, cell constant=0.1) in connection with a conductivity bridge Model RC1, Industrial Instruments, Inc., or equivalent.

The conductivity method is as follows:
1. Dilute the sample to 4% SiO$_2$ and adjust the pH to 4.0, and temperature to 25° C.
2. Measure conductivity and calculate the specific conductance of the solution, L, from the resistance reading and the cell constant. $L = K/R$.
3. Obtain the specific conductance due to the salt, L$_s$, from the equation: $L_s = L - 0.000043$.
4. Calculate the salt content, C$_s$, as follows:

$$C_s = \frac{1000 \times L_s}{124}$$

where C$_s$ is equivalent to the normality of the salt as Na$_2$SO$_4$ in the solution. (Note—This assumes an average value of equivalent conductance of Na$_2$SO$_4$ of 124. This assumption is probably within ±4% as long as the N Na$_2$SO$_4$ is less than 0.01.)

5. The normality of the total sulfate in the sol is C$_s$ +0.0001, since the sulfuric acid concentration in a solution at pH 4.0 is 0.0001.
6. Calculate the per cent salt from the relationship: per cent Salt = (N Sulfate) × 7.1.

The percent salt should not be in excess of 0.05% in sols of this invention.)

The size of the silica particles can be determined by alkaline titration. The titration is carried out with hand agitation (stirring paddle) in a beaker, using 0.1 N hydrochloric acid (need not be standardized), C. P. sodium chloride, and standard 0.1 N sodium hydroxide. The pH is measured by means of a type E (high sodium concentration) glass electrode with standard calomel reference electrode checked against pH 10 buffer. A 25 ml. burette is adequate for products of surface areas up to 700 m.$^2$/g.

To determine the specific surface area of the particles of a sol, a quantity containing 1.50 g. of silica is diluted to about 80 ml. with distilled water and treated with hydrochloric acid to reduce the pH to 3.6–3.7. Thirty grams of sodium chloride is added and then distilled water to make a total of 150 m. (169 g.). The temperature is adjusted to 25°±0.5° C. and the pH adjusted to 4.00 with 0.1 N sodium hydroxide.

The quantity of sodium hydroxide required to raise the pH from 4.00 to 9.00 is determined by titrating directly to pH approximately 8.7, and taking 3 to 4 readings in the region 8.7 to 9.3. The pH is considered constant if it varies less than 0.01 unit during 30 sec. The entire determination, once started, should be completed without delay, since erroneous results may be obtained due to gelation or slow absorption of alkali. Reproducible results are obtained within 1 to 5 minutes after addition of base, but true equilibrium is not achieved even after 15 to 20 minutes. In the region of pH 8.5 to 9.5, the logarithm of the quantity of base added varies directly with the pH, and the volume of base required to give pH 9.00 is obtained from a plot of these variables.

The specific surface area of the sol is obtained from the equation $S_t = 31.8 \ V - 28$ where $S_t$ is the specific surface area as determined by titration, and V is the volume of 0.1 normal sodium hydroxide required to raise the pH from 4.00 to 9.00.

Surface area can also be determined by nitrogen adsorption according to well known techniques.

Clarity and uniformity can be determined by the per cent transmission. In carrying out the determination, the sol is first diluted to 4% SiO$_2$ and deionized. This may be done by stirring about 50 ml. of the sol (4% SiO$_2$) with a cation exchange resin (e. g., "Nalcite HCR" in the hydrogen form) until the pH is in the range 2.5–3.0, followed by treatment with an anion exchanger (e. g., "Amberlite IR–4B, hydroxyl form) until the pH is in the range of 3.5–4.0. The mixed resin is then filtered from the sample, and 25 ml. of this material is transferred to a cylindrical 30 ml. adsorption cell. The initial per cent transmission reading is then taken, using distilled water as a calibrating standard, and a blue (425 millimicron) filter.

(NOTE.—If "Amberlite IR–4B resin is used for deionizing the sols, it should be washed with distilled water shortly before use, in order to prevent "thrown color," which will give an abnormally low reading for the initial per cent transmission.)

Gel content can be determined from viscosity data. In measuring viscosity, the same silica sol which was deionized for turbidity measurement may be used, after adjusting the pH of the sol to 2.0 with 1 N HCl. The absolute silica content is not important, a concentration of 4% $SiO_2$ as used in turbidity measurements being convenient. The drain time of the silica sol is measured with an Ostwald pipette, using a 10 ml. sample. All measurements are made at 30° C. In laboratory measurements, a Kimball EXAX, B150 pipette, size 100, can be used.

The relative viscosity, $N_r$, is then calculated from the following expression:

$$N_r = \frac{dt}{d_w t_w}$$

where $d$ and $t$ are the density and drain time of the silica sol being investigated and $d_w$ and $t_w$ are the density and drain time of water, respectively.

The per cent silica in the dispersed phase is then calculated, using the relationships developed by Mooney:

$$\log_e \frac{n}{n_0} = \frac{2.5c}{1-1.43c} \quad (\text{NOTE: } N_r = n/n_0)$$

where $c$ is the fraction of the total volume of the dispersion which is occupied by the viscosity creating dispersed phase. (See Journal of Colloid Science 6, 162–179 (1951).) From this value of $c$, one can calculate the per cent silica by weight in the dispersed phase, using the relationship:

$$S = \frac{A}{c(1-0.00566A)+0.00566A}$$

where S is the per cent silica by weight in the dispersed phase, and A is the per cent silica by weight in the silica sol.

In addition to having the properties hereinabove described, the preferred sols of this invention are characterized by having a per cent solids, as $SiO_2$ by weight, in the dispersed phase, of from 40% to 90%, and still more preferably in the range of 70 to 90%. The clarity and uniformity of the preferred sols is such as to give a "per cent transmission" of from 85 to 96, as measured by the above-described test. The gel content of preferred products is not in excess of an amount equivalent to a per cent solids, in the dispersed phase, of 40 per cent, as just mentioned.

The sols of the invention are stable for prolonged periods of storage, in contrast to sols of this particle size range heretofore available which would gel in a few days or a few weeks at best.

The sols are useful for imparting soil resistance to carpet piles, especially on piles of synthetic fibers such as rayon, as already described.

The invention will be further understood by reference to the following illustrative examples in addition to those already given.

*Example 1*

A silicic acid effluent was prepared by passing a dilute (3% $SiO_2$:$Na_2O$=3.25, through an ion exchange column in the hydrogen form. This silicic acid sol was adjusted to $SiO_2$:$Na_2O$ ratio of 80 by adding sodium silicate (28.4% $SiO_2$;$SiO_2$:$Na_2O$=3.25). The alkalized sol was heated to 100° C. for one-half hour in order to grow the silica particles to about 8 millimicrons (corresponding to about 350 m.²/g. surface area.) This sol was cooled and completely deionized by alternate treatments with cation–anion–cation–anion exchange resin. ("Nalcite" HCR, hydrogen form and "Amberlite" IR-4B respectively.) The ratio of the sol was then adjusted to $SiO_2$:$Na_2O$=200 by adding 0.5 N NaOH solution. This sol was then concentrated by a rapid boil down in an open pot, while blowing air across the surface of the sol, at about 95° C. to 24.27% $SiO_2$. The product was essentially water-clear. The sol was stable, i. e., it did not gel, for several months standing at room temperature.

*Example 2*

A silicic acid sol was prepared by passing a sodium silicate solution ($SiO_2$=2%; $SiO_2$: $Na_2O$=3.25) through a column of Nalcite HCR ion exchange resin in the hydrogen form. Sodium silicate solution (28.4% $SiO_2$; $SiO_2$:$Na_2O$=3.25) was added to this sol to give an $SiO_2$:$Na_2O$ ratio of 100. The alkalized sol was aged at 80° C. for 1 hour. The resulting sol had particles having a surface area of 600 m.²/g. as determined by titration. This sol was cooled, deionized by stirring with a mixture of anion–cation exchanged resin. By adjusting the pH to 4.0 and measuring the conductivity, it was shown that the salt content was essentially zero. The $SiO_2$:$Na_2O$ ratio of this sol was adjusted to 100 and the sol was concentrated to 16% $SiO_2$ by evaporation at 60° C. The particles in the concentrated sol had a specific surface area of 600 m.²/g. as determined by titration. The sol was water-clear, having a per cent transmission of over 95%. The solids in the dispersed phase as determined by viscosity was 80%. The sol was stable on storage at room temperature.

*Example 3*

A silicic acid sol was prepared and alkalized to 100 ratio as per Example 2. The sol was concentrated by evaporation at 95° C. over a period of 5 hours to 17% $SiO_2$. During this process the particles in the sol grew until the final particles size corresponded to a surface area of 420 m.²/g. The sol was completely deionized with mixed anion-cation resin, until conductivity showed that it contained less than 0.005% salt. The sol was adjusted to 100 $SiO_2$:$1K_2O$ mol ratio, whereupon it was stable on storage for several months (duration of test) at room temperature. The solids' dispersed phase as determined by viscosity was 85%; the transmission 91%.

I claim:

1. A water-clear, stable silica aquasol containing dense, discrete silica particles which are 5 to 8 millimicrons in diameter, said particle size corresponding to a specific surface area, A, of 350 to 600 square meters per gram, the sol having a silica concentration, as per cent $SiO_2$, of from $$15 \text{ to } \frac{12,000}{A}$$

being alkali-stabilized with an amount of alkali sufficient to give an $SiO_2$:alkali oxide mol ratio of from $$\frac{1.2 \times 10^4}{A} \text{ to } \frac{12 \times 10^4}{A}$$

and containing substantially no soluble salts.

2. A water-clear, stable silica aquasol containing silica particles which are 5 to 8 millimicrons in diameter, said particle sizes corresponding to a specific surface area, A, of 350 to 600 square meters per gram, the per cent solids, as $SiO_2$ by weight, in the dispersed phase being from 40 to 90, the sol having a silica concentration, as per cent $SiO_2$, of from $$15 \text{ to } \frac{12,000}{A}$$

being alkali-stabilized with an amount of alkali sufficient to give an $SiO_2$:alkali oxide mol ratio of from $$\frac{1.2 \times 10^4}{A} \text{ to } \frac{12 \times 10^4}{A}$$

and containing substantially no soluble salts.

3. A water-clear, stable silica aquasol containing dense, discrete silica particles which are 5 to 8 millimicrons in diameter, said particle sizes corresponding to a specific surface area, A, of 350 to 600 square meters per gram, the sol having a silica concentration, as per cent $SiO_2$, of from $$15 \text{ to } \frac{12,000}{A}$$

being alkali-stabilized with an amount of a sodium base sufficient to give an $SiO_2$:$Na_2O$ mol ratio of from $$\frac{1.2 \times 10^4}{A} \text{ to } \frac{12 \times 10^4}{A}$$

and containing substantially no soluble salts.

4. A water-clear, stable silica aquasol containing dense, discrete silica particles which are 5 to 8 millimicrons in diameter, said particle sizes corresponding to a specific surface area, A, of 350 to 600 square meters per gram, the sol having a silica concentration, as per cent $SiO_2$, of from $$15 \text{ to } \frac{12,000}{A}$$

being alkali-stabilized with an amount of a sodium base sufficient to give an $SiO_2$:$Na_2O$ mol ratio of from $$\frac{1.2 \times 10^4}{A} \text{ to } \frac{12 \times 10^4}{A}$$

and having a salt content so low that it does not exceed 0.05% by weight, calculated as $Na_2SO_4$.

5. A stable silica aquasol containing dense, discrete silica particles which are 5 to 8 millimicrons in diameter, said particle sizes corresponding to a specific surface area, A, of 350 to 600 square meters per gram, the sol having a silica concentration, as per cent $SiO_2$, of from $$15 \text{ to } \frac{12,000}{A}$$

being alkali-stabilized with an amount of alkali sufficient to give an $SiO_2$: alkali oxide mol ratio of from $$\frac{1.2 \times 10^4}{A} \text{ to } \frac{12 \times 10^4}{A}$$

containing substantially no soluble salts, and being so clear that the light transmission is greater than 85%.

6. A water-clear, stable silica aquasol containing dense, discrete silica particles which are 5 to 8 millimicrons in diameter, said particle sizes corresponding to a specific surface area, A, of 350 to 600 square meters per gram, the sol having a silica concentration, as per cent $SiO_2$ of from $$15 \text{ to } \frac{12,000}{A}$$

being alkali-stabilized with an amount of a sodium base sufficient to give an $SiO_2$:$Na_2O$ mol ratio of from $$\frac{1.2 \times 10^4}{A} \text{ to } \frac{12 \times 10^4}{A}$$

and having a salt content so low that it does not exceed 0.05% by weight, calculated as $Na_2SO_4$.

7. A stable silica aquasol containing silica particles which are 5 to 8 millimicrons in diameter, said particle sizes corresponding to a specific surface area, A, of 350 to 600 square meters per gram, the per cent solids, as $SiO_2$ by weight, in the dispersed phase being from 70 to 90, the sol having a silica concentration, as per cent $SiO_2$, of from $$15 \text{ to } \frac{12,000}{A}$$

being alkali-stabilized with an amount of a sodium base sufficient to give an $SiO_2$:$Na_2O$ mol ratio of from $$\frac{1.2 \times 10^4}{A} \text{ to } \frac{12 \times 10^4}{A}$$

having a salt content so low that it does not exceed 0.05% by weight, calculated as $Na_2SO_4$, and being so clear that the light transmission is greater than 85%.

References Cited in the file of this patent

UNITED STATES PATENTS

| | | |
|---|---|---|
| 2,574,902 | Bechtold et al. | Nov. 13, 1951 |
| 2,631,134 | Iler et al. | Mar. 10, 1953 |
| 2,680,721 | Broge et al. | June 8, 1954 |

FOREIGN PATENTS

| | | |
|---|---|---|
| 611,914 | Great Britain | Nov. 5, 1948 |